March 20, 1934.  M. STEWART  1,951,680
LIFTING MEANS FOR AUTOMOBILES
Filed May 11, 1932
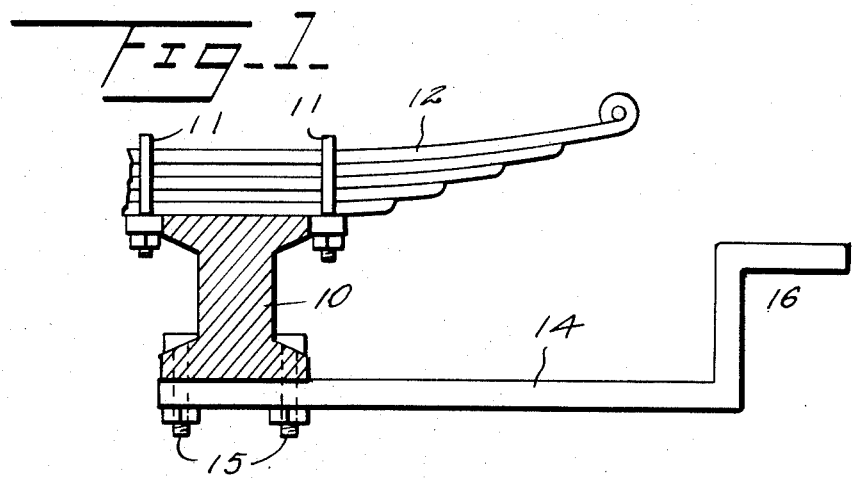
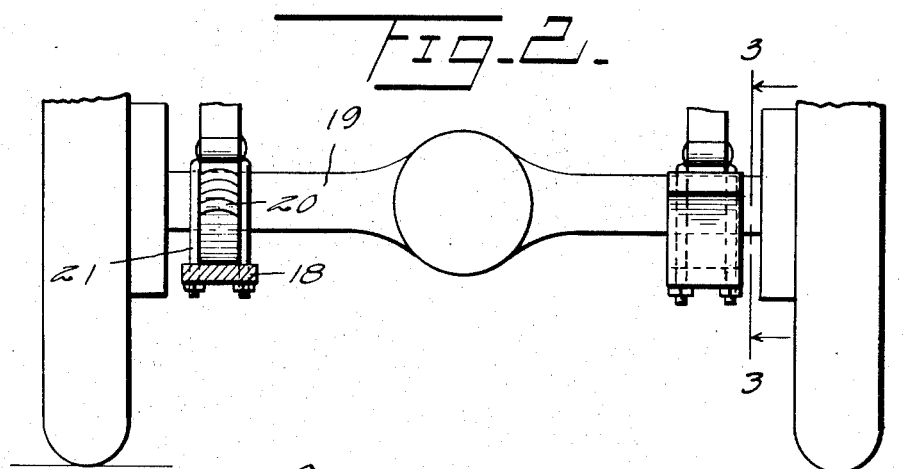
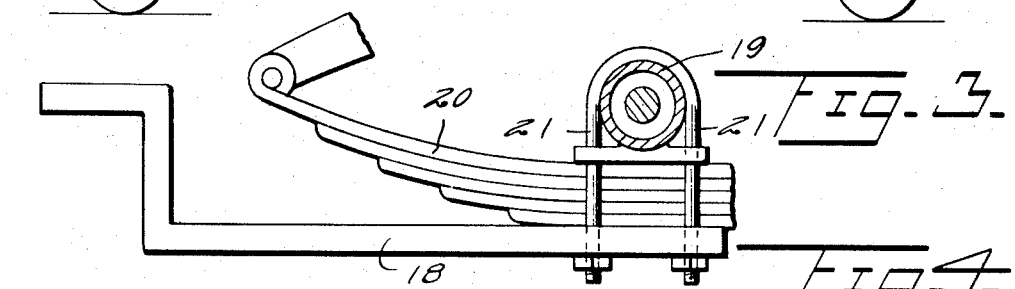
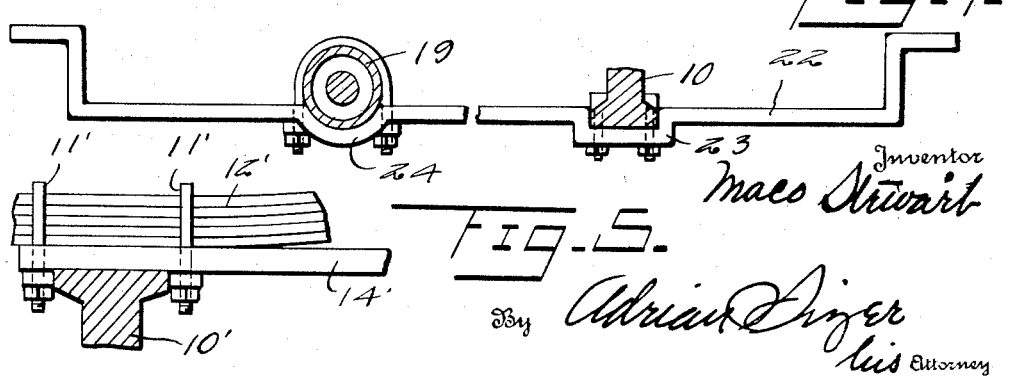

Patented Mar. 20, 1934

1,951,680

UNITED STATES PATENT OFFICE 1,951,680

LIFTING MEANS FOR AUTOMOBILES

Maco Stewart, Galveston, Tex.

Application May 11, 1932, Serial No. 610,683

5 Claims. (Cl. 254—133)

The object of this invention is to provide means adapted to be carried by a motor car, below the axle or axles thereof, or in other suitable position, which will be easily accessible for the application thereunder of a lifting jack, so that the necessity of placing the latter directly under the axle may be avoided.

A further object is to provide a particular form of bracket or other attachment, or mounting means, to be fixed in position with reference to the axle or axles (or connected with the housing of the rear axle), and suitably mounted with reference to the leaf spring or springs, whereby the purpose above indicated will be served and the attachment will be useful within the limits defined by the bumpers, no obstruction or the like and no undesirable effect being produced.

A further object is to provide a form of attachment, bracket or bar, which may include a depressed portion or portions for the reception of one or both axles, so that with the addition of U-bolts or the like, or by the use of the bolts commonly employed in connection with the mounting of the springs, an efficient and economical assembly will result, and much unnecessary effort will be saved in connection with the manipulation of the jack.

A further object is to provide axle-carried elements which may be readily applied or detached, as the case may be.

With the foregoing and other objects in view, the invention consists in the novel assembly herein disclosed, and disclosed in the accompanying drawing, it being understood that alterations or modifications may be made within the scope of the claims, without departing from the spirit of the invention or conception.

In the drawing,

Figure 1 is a view in elevation and section, showing the manner of attaching the device to the front axle of a motor vehicle.

Figure 2 is a fragmentary view showing a rear axle or housing therefor in elevation, and showing the position of the attachment with reference to the leaf spring.

Figure 3 is a section on line 3—3 of Figure 2.

Figure 4 shows how the attachment may be mounted with reference to both axles, in a modified assembly, the axles being in section, and the bar extending longitudinally of the vehicle.

Figure 5 is a detail showing a further modification in which the attachment is carried above the front axle and between the latter and the leaf spring.

In Figure 1 a front axle of a motor vehicle is designated 10, and connected therewith by bolts 11 of the usual type, is a spring 12. Below the axle a lifting bar 14, assumed to be sufficiently heavy for carrying out the general purposes of the invention, is secured by bolts 15, or secured in any suitable manner.

Bar 14 is provided with an offset at its forward end as shown at 16, in order to afford ample clearance between this element and the ground, for conveniently locating the lifting jack, not shown.

In Figures 2 and 3 an arrangement is illustrated by means of which the same principle is carried out by applying bars 18 to the housing 19 of the rear axle, the bars being secured in this instance to spring 20 and the axle, by U-bolts 21.

Figure 4 shows a form or modification in which a continuous longitudinal bar 22 may be employed on each side of the car, the bar being formed with depressed portions or seats 23, 24, conforming to the forward and rear axle members, respectively. The continuous bar or bars distribute the strain, so that if the load is considerable there will be no undue wrenching action on the connections. A relatively light steel bar will serve the purpose.

Figure 5 illustrates a forward axle 10′ mounting the lifting bar 14′ above the axle and between the latter and spring 12′. Bolts 11′ serve the usual purpose in connection with the mounting of the spring 11.

What I claim is—

1. The combination with an axle of a motor vehicle, of a bar substantially rigid with reference to the axle and having an unobstructed outer end portion, projecting beyond each axle spaced above the wheel base and extending longitudinally of the vehicle, to points of clearance.

2. The combination with an axle of a motor vehicle, of a bar positioned for engagement by a lifting jack, a spring for said vehicle, and devises for securing the bar and spring to the axle in one assembly, said spring extending transversely of the axle, and the bar extending to a point of clearance beyond each axle of the vehicle.

3. In a device for lifting a car by the use of a jack, means extending longitudinally of the car beyond each axle and including depressed portion in which axles of different cross section are retained against displacement in a direction longitudinally of the car.

4. In a device for lifting a motor car by means of a jack, unitary means extending longitudinally of the car beyond each axle and including portions providing seats for axles of different cross section, said seats providing shoulders alongside of the axles.

5. The combination with the axles of a motor vehicle, of spaced bars extending longitudinally of the vehicle, in axle-lifting position, the bars having ends extending beyond each axle, and said bars having recessed seats formed therein, the seats conforming respectively to the cross section of the lower portions of the axles.

MACO STEWART.